United States Patent Office 3,342,761
Patented Sept. 19, 1967

3,342,761
DRY TYPE AND PASTE TYPE JOINT CEMENTS CONTAINING POLYVINYL ACETATE AND POLYVINYL ALCOHOL AS BINDERS
Walter J. Wilkinson, Wilbraham, Bernard M. Brill, Springfield, and Robert V. De Shay, East Longmeadow, Mass., assignors, by mesne assignments, to Monsanto Company, a corporation of Delaware
No Drawing. Filed Oct. 30, 1962, Ser. No. 234,227
1 Claim. (Cl. 260—17.4)

This invention pertains to wallboard joint cements; more particularly, it relates to dry type and paste type joint cements using as adhesive dextrin stabilized polyvinyl acetate and polyvinyl alcohol.

In dry wall construction, a method now very popular in the building of residences, a cement is used as an embedding adhesive for the wallboard tape applied wherever two pieces of wallboard are butted together. After the tape has been embedded, topping cement is applied to level the joint area with the rest of the wall. This combination of cement and tape covers or seals the joints and provides a smooth, uniform surface ready for painting or finishing.

The adhesive in conventional cements used for this purpose is generally and predominantly a protein material such as casein or soya protein. In spite of their acknowledged usefulness, protein joint cements possess several undesirable features. They cannot be stored for any length of time in paste form because of putrefaction and instability. After two to four hours, casein pastes undergo a moderate decrease in viscosity which may become rather pronounced after 24 hours. Protein cements are slow-drying; it is sometimes necessary to wait as long as 24 hours for one coat of such cements to dry before another coat can be applied. Other difficulties which commonly arise with these cements after they have been applied and dried are beading, blistering, edge-cracking, i.e. cracking near the edge of the tape, and shrink-cracking. Unfavorable job practices such as incorrect dilution of the dry cement and poor job conditions, for instance low temperature and high relative humidity, often magnify these defects.

Attempts to overcome these defects of protein binder joint cements, defects which are ultimately translated into increase in time and in labor costs of construction, have led to the formulation of new cements in which the protein binder is replaced with vinyl resins. Remarkable improvements have been achieved by this substitution but only with the inconvenience of having to employ ternary binder mixtures such as starch, polyvinyl alcohol and polyvinyl acetate stabilized polyvinyl acetate mixtures. Styrene-butadiene polymers have also been tried as binders, but the broad range of adhesive characteristics of polyvinyl acetate favors the latter resin as do the excellent aging and freeze-thaw properties of certain specific types of this resin.

It is therefore an object of this invention to provide non-protein binder joint cements that may be used both as embedding and topping cements. It is also an object to provide cements that are stable on storage in dry form and in paste form. Another object is to provide cements that undergo a minimum of volume shrinkage on drying so that fewer minimum of coats are needed for a given application. Still another object is to furnish to the trade fast drying and strongly adhesive cements that are substantially free from beading, blistering, edge-cracking and shrink-cracking.

These objects have been accomplished by the formulation of joint cements based on binder systems composed of a special dextrin stabilized spray dried polyvinyl acetate resin emulsion, cold water soluble polyvinyl alcohol or a mixture of these two resins. The bulk of the ingredients in these new cements consists of course of the more or less inert fillers which are conventional to this type of composition, with the exception however, that the employment of talc or lime is dependent on the type of cement prepared in that the selection of talc rather than lime is critical for paste type cements.

As to the advisability of using a single or a binary binder in these cements, it has been found that the use of both polyvinyl alcohol and polyvinyl acetate in the proportions required, produces all purpose embedding and topping cements, while cements containing only polyvinyl alcohol work best under low temperature application conditions, i.e. less than 72° F., and polyvinyl acetate cements are quite satisfactory at normal temperature, i.e. at least 72° F., or as topping cements.

The following examples will provide a better understanding of the invention. All parts and percentages are on a weight basis.

Example I

| Formulation: | Parts by weight |
|---|---|
| Potassium tripolyphosphate | 7.0 |
| Methyl cellulose, 4000 cps. grade | 17.0 |
| Fine ground asbestos | 170.0 |
| Powdered Georgia marble (CaCO$_3$) | 2,560.0 |
| Fine ground mica | 170.0 |
| Talc, Sierra Mistron Vapor | 31.5 |
| Sodium acetate, anhydrous | 2.0 |
| Polyvinyl acetate powder | 69.5 |
| "Gelvatol 20/30 BP" polyvinyl alcohol | 23.0 |
| | 3,050.0 |

"Sierra Mistron Vapor" talc is a commercially available talc of very high purity containing about 5% water, 62.5% silicon dioxide and 30.6% magnesium oxide, the balance of its composition being principally an iron oxide and some carbonates. It is a very soft, non-abrasive material of very fine particle size, 50% of the particles have a diameter of less than 1 micron and no particle diameter exceeds 6 microns, and of large surface area, i.e. about 19.2 square meters per gram of powder.

The polyvinyl acetate used is a spray dried, water-dispersible powder obtained from an aqueous emulsion of polyvinyl acetate containing 60% solids by weight and stabilized with a 10% dextrin by weight. The powder is free-flowing and has an average particle size of approximately 15 microns.

"Gelvatol 20/30 BP" is a very fine powder of about 88% hydrolyzed polyvinyl acetate with a viscosity of 4 to 6 centipoises as a 4% aqueous solution at 20° C.

In order to apply and use these ingredients, they are first mechanically blended. The mix is then added to water while stirring by hand, about 47 parts of water being used for each 100 parts of dry mix. Once the paste is smooth, it is allowed to soak for 30 minutes and the batch is remixed before use.

Example II

Another excellent dry type joint cement can be formulated as that of Example I, except that autoclaved lime, 61.5 parts, is substituted for the talc, 31.5 parts. This dry mix is quite stable on storage. Prior to application and use, it is made into a paste by stirring it into about 1540 parts of water.

Example III

As indicated earlier, joint cements containing lime have been found not too stable on storage in paste form. An excellent, stable paste which can be shipped and stored without loss of critical properties can be prepared by diluting 3,050 parts of the Example I dry mix with approximately 1,420 parts of water in which has been previously dissolved 4.4 parts of a water soluble fungicide, for example Dowicide A.

*Example IV*

Another dry mix joint cement was prepared with the following ingredients.

| Formulation: | Parts by weight |
|---|---|
| Potassium tripolyphosphate | 4.0 |
| Methyl cellulose, 4000 cps. grade | 9.0 |
| Fine ground asbestos | 100.0 |
| Fine ground mica | 100.0 |
| Powdered Georgia marble ($CaCO_3$) | 900.0 |
| Sierra talc, C400 | 600.0 |
| "Gelvatol 20/30 BP" polyvinyl alcohol | 34.2 |
| | 1,747.2 |

This is a single binder joint cement which can be packaged as a paste by simply adding water and fungicide in proportions approximately similar to those of Example III and mixing in a beater type mixer.

Sierra talc "C400" is a so-called paint talc which is soft and very white and which differs from the talc employed in the preparation of Example I cement principally in particle size and therefore in surface area per weight. The approximate maximum particle size of "C400" is 46 microns.

*Example V*

A less expensive dry type single binder joint cement may be prepared according to the formula of Example IV, substituting "Sierra Mistron Vapor" grade talc for the "C400." In such cases, 17 parts of the talc is used and the rest of the formula weight is made up with a calcium carbonate (Georgia marble).

*Example VI*

Excellent one binder joint cements can be made with dextrin stabilized polyvinyl acetate alone. A typical formulation follows.

| Formulation: | Parts by weight |
|---|---|
| Potassium tripolyphosphate | 7.0 |
| Methyl cellulose, 4000 cps. grade | 17.0 |
| Fine ground asbestos | 170.0 |
| Powdered Georgia marble ($CaCO_3$) | 2,499.5 |
| Fine ground mica | 170.0 |
| Talc, Sierra Mistron Vapor | 31.5 |
| Sodium acetate, anhydrous | 2.0 |
| Polyvinyl acetate powder (Example I type) | 153.0 |
| | 3,050.0 |

This composition may be packaged and stored either in dry or paste form, as taught in Examples I and III.

The properties of these dry type and paste type joint cements have been tested by the following methods:

*Ease of application.*—A 4 inch wide layer of joint cement approximately 1/16 of an inch in depth and 20 inches long is drawn down with a broad knife on a 2 foot by 4 foot panel of wallboard. Joint tape is embedded in the cement with two strokes of the knife. The edges are then feathered. A second coat is applied immediately. The application characteristics are then noted for each application, namely the slip characteristics, the ease of smoothing and feathering and the flow of the wet cement.

*Block shrinkage.*—Test units for shrinkage evaluation are made with 4" x 4" x 12" blocks of wood of which the four long sides are covered by 3/8" wallboard held in place by metal corner beading. The depression between the metal beadings on each side is then filled with joint cement. The cement is allowed to dry in a circulating air oven at 125° F. When dry, there should not be any cracks in the cement surface nor shrinkage from the metal beading.

*Sandability.*—Fifteen strokes with No. E (fine) flint sandpaper on the second coat of joint cement are given to determine this characteristic. The ease of removing imperfections, of feathering and smoothing of the surface are rated. Bronzing should not occur with the few sanding strokes involved here.

*Adhesion.*—After the tape has been embedded in cement and when the cement has reached a moisture content of about 9%, the joint tape is cut with an X-Acto knife in the form of an X over the center of the tape. The four corners of the cut tape are then pulled back sharply from the center of the X and the strength of the bond as well as the amount of tape failure are judged.

The properties and characteristics measured by the tests, which for practical reasons must remain very roughly quantitative, are rated as outstanding, excellent, very good, good, fair and unacceptable.

All the preparations illustrated in the examples passed the application test with a rating of very good. As to their performance in the remaining tests, that of the two-binder cements (Examples I–III) was generally excellent, rising to outstanding in adhesion to tape after application under usually adverse conditions such as 50° F. and 75% relative humidity. In the case of the paste type cement of Example III, all the ratings were maintained even after submitting the paste, before application, to a five freeze-thaw cycle and to a storage temperature of 125° F. for three days.

The single binder cements (Examples IV–VI) passed all tests with a rating of very good except for the adhesion of polyvinyl alcohol cements applied at 50° and 70° F. which was found excellent, while that of the polyvinyl acetate cement (Example VI) was only fair at 50° F. application but was excellent with the cement applied at 70° F.

The polyvinyl acetate powders usable in the joint cement compositions of this invention are the free-flowing, water dispersible homopolymer powders obtained upon spray drying dextrin stabilized aqueous emulsions of polyvinyl acetate according to the process of Morrison, U.S. Patent 2,800,463. The most satisfactory products are those obtained from emulsions containing from about 7% to about 13% dextrin at a total solids level of about 60% by weight. Said emulsions may also contain certain natural protective colloids such as, for instance, gum arabic.

The other ingredient binder of the cement compositions may be any one of the commercially available cold water soluble polyvinyl alcohols containing not more than 40% by weight of residual unhydrolyzed acetate groups, calculated as polyvinyl acetate, and having a minimum viscosity of 4 centipoises as 4% by weight aqueous solutions at 20° C. Preferred are the types containing about 20% by weight of residual polyvinyl acetate and having a 4% by weight aqueous solution viscosity of about 5 centipoises at 20° C.

The binder mixture in the all-purpose cement of this invention, i.e. usable for tape embedding and for topping, should account for 2.5 to 4% of the total dry cement composition weight, the lesser component being present to the extent of at least 0.5% of the total cement weight. In applications where single binder compositions work satisfactorily, the cements should contain from 2.5 to 8% dextrin stabilized polyvinyl acetate or 1.75 to 8% polyvinyl alcohol. The preferred cement compositions, i.e. those which will provide the best adhesion under all possible on-the-job conditions, are those containing 3 to 4% by weight of an approximately 1:3 polyvinyl alcohol-polyvinyl acetate mixture, or should a single component binder cement be desired, from 4 to 6% by weight polyvinyl acetate or 3 to 5% by weight polyvinyl alcohol.

The preferred thickener in the present composition is a water soluble methyl cellulose having a viscosity of about 4000 centipoises. It should be used in quantities of about 0.5% of the dry mixture weight. A less viscous material of the same chemical nature may be substituted, but in larger amounts. The selection of cellulose thickeners must be restricted to those containing only hydroxyl and ether oxygen atoms.

As indicated earlier, the cement compositions of this invention should contain either lime or talc. About 1 to 3% by weight of lime has been found satisfactory in dry mixes which are to be stored as such until used; the preferred amount is about 2% by weight. On the other hand, if the cement composition is to be stored as a ready-to-use paste, about 0.5 to 2% of an ultrafinely divided talc should be substituted for the lime; about 1% by weight, dry basis, of a material with particle size ranging up to 10 microns in diameter is preferred. As shown in Example IV, a coarser material may be used provided that it is added in such quantity that the required amount of fine particles is still present. In such a case, the extra inert material thus added merely replaces part of the calcium carbonate (powdered marble) of the compositions. In general, any very finely divided inert material will serve as well as the talc. Usable materials include clay, mica, alumina and colloidal silica. Materials having a plate-like crystal habit are preferred.

The bulk of the cement compositions consists of conventional inert fillers. In the examples, there has been used about 6% finely ground asbestos, based on the total dry cement weight, about 6% mica and, after adding these particular fillers and the active ingredients, i.e. the binder, the thickener, the ultrafines, the dispersing agent and the sodium acetate, the composition has been made up to 100% with powdered Georgia marble or calcium carbonate. The selection of fillers and the proportions to be used are not part of this invention, although the handling properties, drying time, etc. of the present compositions are favored by the actual filler compositions employed in the examples.

Other ingredients may be added to the present compositions for various purposes. For example, as shown earlier, small amounts of surface active agents and sodium acetate may be incorporated to facilitate dispersion and to improve adhesion. Fungicides may also be added, although this is not as critical as in protein type cements.

What is claimed is:

A dry joint cement composition comprising: (A) a binder composition consisting of a member of the class consisting of (a) 2.5 to 8% of the total dry composition weight of a spray-dried dextrin stabilized polyvinyl acetate emulsion powder containing about 7 to 13 parts dextrin per about 60 parts of the combined weight of dextrin and polyvinyl acetate, (b) 1.75 to 8% of water soluble polyvinyl alcohol and (c) 2.5 to 4% of a mixture of these vinyl resins containing at least 0.5% of the total dry composition weight of the lesser vinyl component; (B) about 0.5 to 2% of talc with particles not greater than 6 microns in diameter, and (C) inert fillers as the bulk of the composition.

References Cited
UNITED STATES PATENTS

| | | | |
|---|---|---|---|
| 2,311,233 | 2/1943 | Jaenicke | 260—29.6 |
| 2,733,995 | 2/1956 | Robinson | 260—29.6 |
| 2,800,463 | 7/1957 | Morrison | 260—17.4 |
| 3,104,234 | 9/1963 | Bray | 260—17.4 |

SAMUEL H. BLECH, *Primary Examiner.*

WILLIAM H. SHORT, *Examiner.*

J. NORRIS, *Assistant Examiner.*